US010720840B2

(12) United States Patent
Thomas et al.

(10) Patent No.: US 10,720,840 B2
(45) Date of Patent: Jul. 21, 2020

(54) DC-DC CONVERTER CIRCUIT WITH SYNCHRONIZATION MODULE AND CORRESPONDING CONVERSION METHOD

(71) Applicants: STMicroelectronics Design and Application s.r.o., Prague (CZ); STMicroelectronics S.r.l., Agrate Brianza (IT)

(72) Inventors: Matthieu Thomas, Prague (CZ); Michele Suraci, Gorla Minore (IT); Massimo Mazzucco, Savona (IT)

(73) Assignees: STMICROELECTRONICS S.R.L., Agrate Brianza (IT); STMICROELECTRONICS DESIGN AND APPLICATION S.R.O., Prague (CZ)

( * ) Notice: Subject to any disclaimer, the term of this patent is extended or adjusted under 35 U.S.C. 154(b) by 0 days.

(21) Appl. No.: 16/222,557

(22) Filed: Dec. 17, 2018

(65) Prior Publication Data

US 2019/0214910 A1    Jul. 11, 2019

(30) Foreign Application Priority Data

Dec. 22, 2017    (IT) .................... 102017000149365

(51) Int. Cl.
*H02M 3/158* (2006.01)
*H02M 1/08* (2006.01)
*H02M 1/00* (2006.01)

(52) U.S. Cl.
CPC ....... *H02M 3/1582* (2013.01); *H02M 3/1584* (2013.01); *H02M 1/08* (2013.01);
(Continued)

(58) Field of Classification Search
CPC . H02M 2001/0012; H02M 2001/0048; H02M 3/156; H02M 3/157; H02M 3/158;
(Continued)

(56) References Cited

U.S. PATENT DOCUMENTS 6,495,995 B2 * 12/2002 Groom ................ H02M 3/1584
323/283
9,774,322 B1 * 9/2017 Duduman ............ H03K 17/223
(Continued)

FOREIGN PATENT DOCUMENTS

EP    1 703 626 A2    9/2006

*Primary Examiner* — Yusef A Ahmed
*Assistant Examiner* — Shahzeb K Ahmad
(74) *Attorney, Agent, or Firm* — Seed Intellectual Property Law Group LLP

(57) ABSTRACT

A DC-DC converter circuit including at least: a first step down converter having a first pair of switching devices in a half bridge configuration. A second step down converter includes a second pair of switching devices in a half bridge configuration. The first and second step down converters are connected in parallel to an output node connected to an output coil and receive command signals. A feedback loop includes a synchronization module receiving the gate control signals of high side switching devices and adjusts as a function of the gate control signals a delay in a signal path from the command signal to each gate control signal of the high side switching device to synchronize the gate control signals.

20 Claims, 15 Drawing Sheets

(52) U.S. Cl.
CPC .. *H02M 3/1588* (2013.01); *H02M 2001/0006* (2013.01); *H02M 2001/0009* (2013.01)

(58) Field of Classification Search
CPC ............. H02M 3/1584; H02M 3/1588; H02M 2003/1586
See application file for complete search history.

(56) References Cited

U.S. PATENT DOCUMENTS

| | | | |
|---|---|---|---|
| 9,882,477 B2* | 1/2018 | Childs | H02M 3/158 |
| 2010/0001704 A1 | 1/2010 | Williams | |
| 2012/0256659 A1* | 10/2012 | Kiadeh | H02M 3/1584 |
| | | | 327/108 |
| 2012/0319754 A1* | 12/2012 | Lee | H02M 1/38 |
| | | | 327/208 |
| 2013/0307503 A1* | 11/2013 | Ouyang | G05F 1/10 |
| | | | 323/282 |
| 2014/0145692 A1* | 5/2014 | Miyamae | H02M 3/158 |
| | | | 323/271 |
| 2015/0061625 A1 | 3/2015 | Chen et al. | |
| 2016/0013713 A1* | 1/2016 | Li | H02M 3/1584 |
| | | | 323/312 |
| 2018/0019660 A1* | 1/2018 | Jang | H02M 3/158 |
| 2018/0048232 A1* | 2/2018 | Adell | H02M 3/1563 |
| 2018/0062511 A1* | 3/2018 | Wong | H02M 3/157 |

* cited by examiner

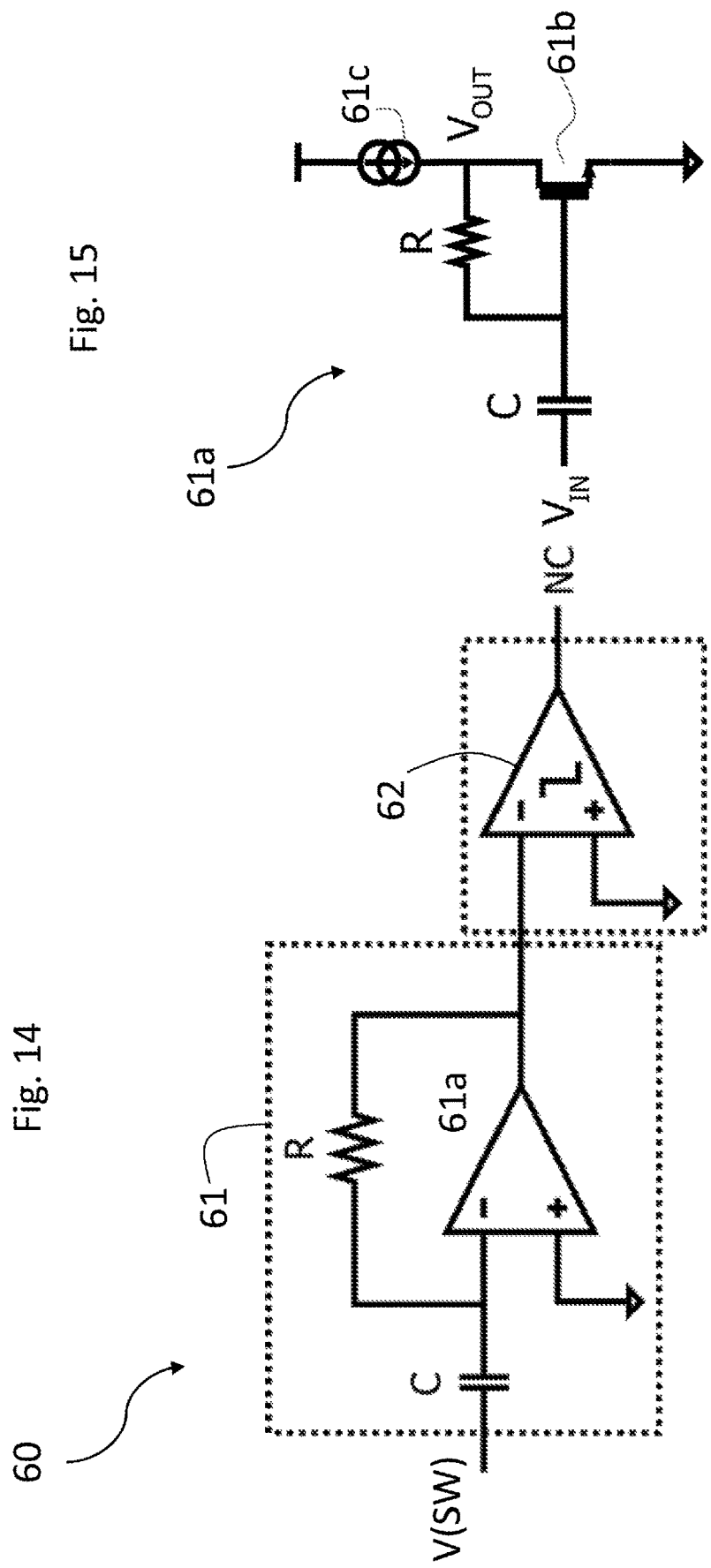

DC-DC CONVERTER CIRCUIT WITH SYNCHRONIZATION MODULE AND CORRESPONDING CONVERSION METHOD

BACKGROUND

Technical Field

The description relates generally to DC-DC power converters and more specifically to a pair of step-down converters configurable as a single step-down converter to provide a doubled current capability and a single step-down converter using two independent power stages.

Description of the Related Art

In hard disk drives (HDD)/solid state drives (SSD)/personal computers (PC) markets, the demand for power is increasing due to the larger size of memories, increased speeds and powerful SoCs (System on Chip) controlling the exchange of data. Improved management of the power distribution within those electronic devices is thus becoming more critical. To tackle this challenge, system designers commonly divide the power distribution in several domains which can be turned on or off according to the needs. Each domain with non-negligible power consumption is then typically supplied by a dedicated DC-DC converter usually called Point of Load regulator. For the implementation, a first solution available for system designers is to use discrete DC-DC converters which give a maximum flexibility but come at an increased cost and printed circuit board (PCB) area utilization. A second solution, often preferred for mass-market application is the use of a more complex PMIC (Power Management Integrated Circuit) integrating several DC-DC converters optimizing cost and PCB area but losing in flexibility.

BRIEF SUMMARY

Embodiments of the present disclosure provide a PMIC integrating several DC-DC converters while at the same time having re-configurability features providing the possibility of addressing several types of PCB designs with a single type of PMIC. This reconfiguration provides the ability to connect power stages of two independent switching converters in parallel, resulting in a single DC-DC converter with a doubled current capability. Package constraints in flexible wire bond packages are progressively being dropped for other packaging methods like flip chip on leads, which present interesting properties like reduced parasitic resistances and inductances. Due to mechanical constraints of an associated frame and current capability of connections between silicon components and the frame in these kinds of packages, it can be necessary to partition the power stage of a single DC-DC Converter into several smaller converters with independent package pins or balls from a power path perspective, and embodiments of the present disclosure enable several smaller converters to be operated in parallel to provide a desired power output.

Embodiments of the present disclosure connect the power stages of two independent switching converters in parallel resulting in a single DC-DC converter with a doubled current capability. Also, synchronization among drivers of power FETs used in switching converters in such a "parallel mode" configuration is desirable.

One or more embodiments of the present disclosure may provide one or more of the following advantages: synchronization, which provides power dissipation matching among power FETs used in parallel and reduces spikes on input rail, improving reliability; synchronization also optimizes efficiency by reducing spikes that allow power stage drivers to be designed for faster operation, reducing losses.

BRIEF DESCRIPTION OF THE SEVERAL VIEWS OF THE DRAWINGS

One or more embodiments will now be described, by way of example only, with reference to the annexed figures, wherein:

FIGS. 14 and 15 show a detail of a circuit module of the circuit of FIG. 13.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. The references used herein are provided merely for convenience and hence do not define the extent of protection or the scope of the embodiments.

When a relatively high level of power is required, the double NFET power stage topology is often preferred for step-down converters because it provides better efficiency or performance for a smaller area or size converter.

Figure 1:
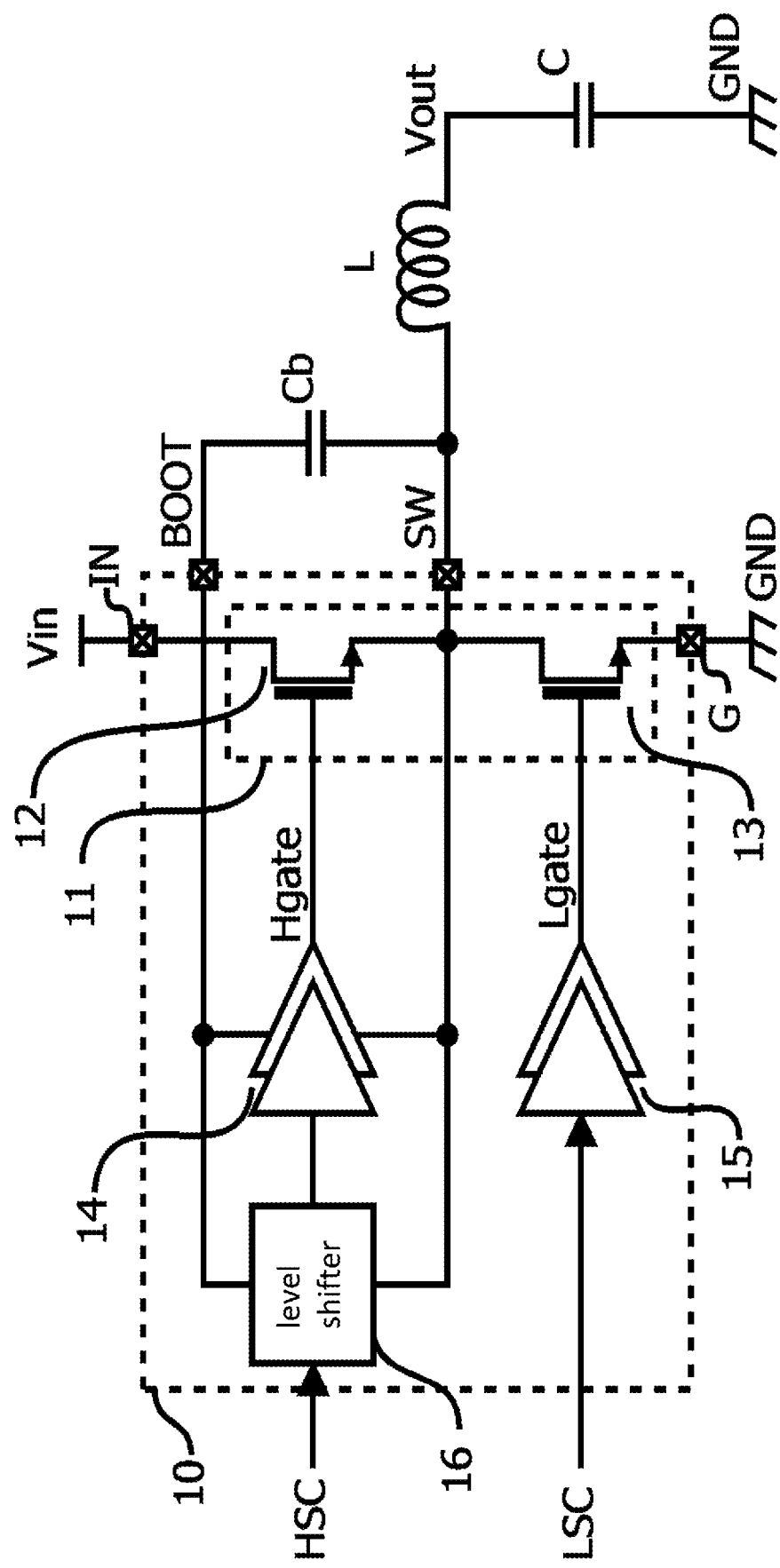
FIG. 1 is a simplified schematic of a known switching converter circuit.

In FIG. 1 is shown the circuit schematic of a DC-DC converter circuit, implemented by a double NFET power stage circuit, indicated with the numerical reference 10.

A half bridge driver stage 11 includes a high side switching device, i.e., an NFET transistor, 12 and a low side switching device, another NFET, 13, arranged in a half bridge architecture. The circuit 10 includes an input node IN connected to an input voltage Vin and ground node G connected to a ground GND. Each of the two NFET transistors 12 and 13 is connected by its gate electrode, respectively Hgate and Lgate nodes, to a respective high side driver 14 and low side driver 15. Here the input of the converter circuit 10 is referred to as the input voltage Vin, as indicated, while a voltage supply of the drivers 14, 15 is referred to as Vcc. More to the point, the supply of the high side driver 14 and low side driver 15 are indeed separated. What is common is the amplitude of the voltage supplying the drivers. The low side driver 15 is supplied between a positive node Vcc and Ground→V(Vcc,GND)=Vcc. The high side driver 14 is supplied between a bootstrap node BOOT and a switching node SW ("floating supply")→V(BOOT,SW)=Vcc for the high side driver. More specifically the input voltage Vin is connected to the input terminal IN to which the drain of the high side NFET 12 is connected, while the source of the low side NFET 13 is connected to the ground node G connected to ground GND. The source of the NFET 12 and the drain of the NFET 13 are connected together and to the switching node SW of the converter circuit 10.

The input of the high side driver 14 is controlled by a level shifter 16, which is in turn controlled by a logical high side command HSC. A logical low side command LSC is fed directly to the input of the low side driver 15. An inductor L, which represents the storage coil of a buck converter, is connected to the switching node SW and its other terminal is connected to the output node Vout. A capacitor C is connected between the output node Vout and Ground, according to the well-known step-down or buck converter architecture.

The bootstrap node BOOT is connected to the positive voltage supply of the driver 14 and level shifter 16.

In this kind of topology, the driver 14 of the high side power NFET 12 is supplied by a bootstrap capacitor Cb, connected between the terminal BOOT and the common terminal SW, which is recharged at each cycle of the converter 10 when the low side NFET 13 is enabled. In the following description it is assumed that the bootstrap capacitor is recharged by a supply voltage Vcc (not expressly labeled in FIG. 4). The high side driver 14 is thus "floating" between the switching node SW and the bootstrap capacitor Cb output.

Figure 2:
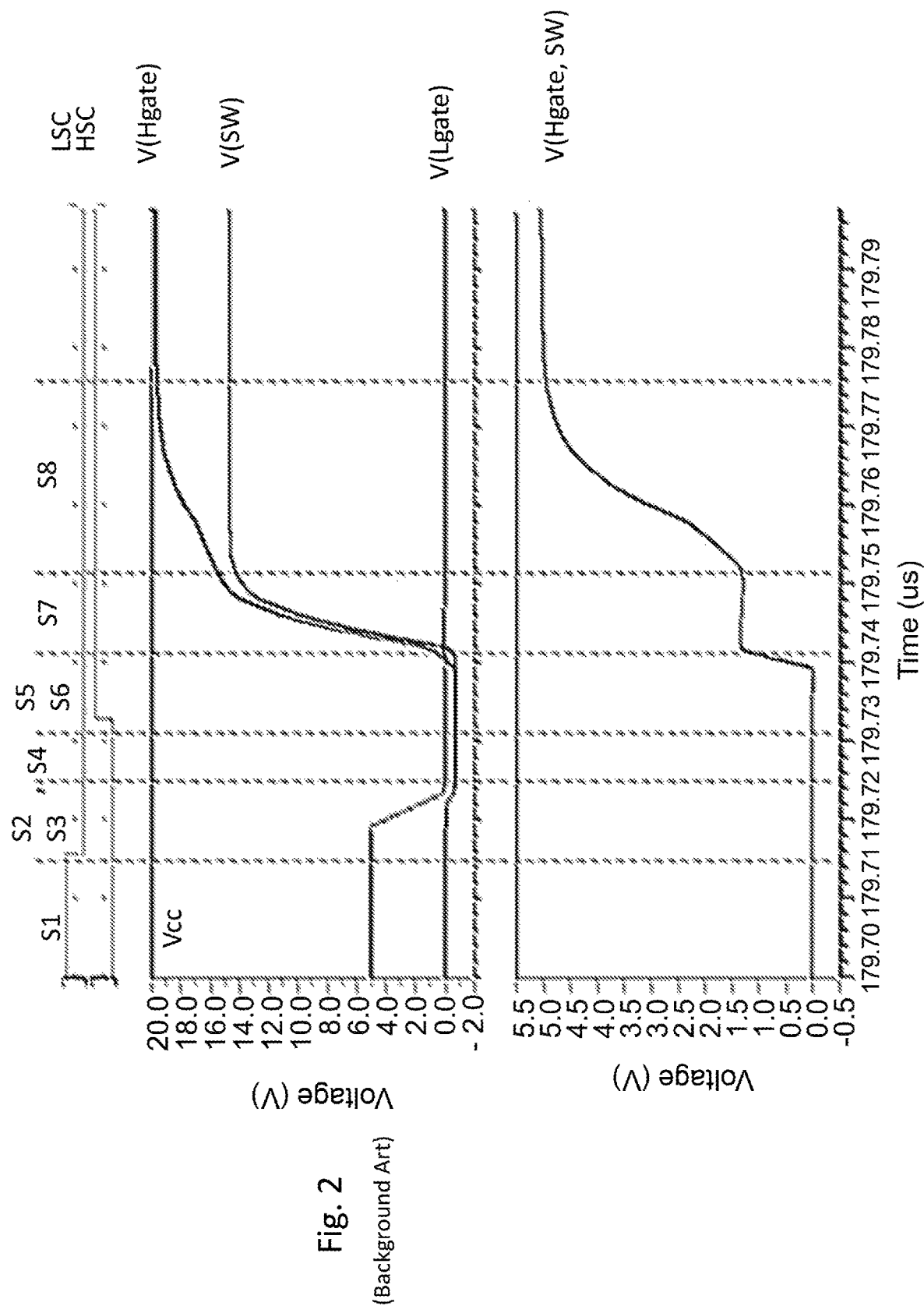
FIGS. 2 and 3 are signal diagrams representing signals of the circuit of FIG. 1.

When the high side power NFET 12 is commanded to turn-on, to avoid destructive cross-conduction a dedicated approach, from now on referred as "Non-overlapping" phase, is used. Operation of this "Non-overlapping phase" during transition from low side NFET 13 to high side NFET 12 is described step by step as follows, assuming the current flowing in the inductor L is positive (i.e., has a first polarity). Wave of the different signals, V(SW) on the switching node SW, V(Hgate) and V(Lgate) on the gates of NFET 12, 13, and voltage V(Hgate, SW) between the gate of the high side NFET 12 and the switching node SW, illustrating this behavior or operation are shown in the diagram of FIG. 2 as a function of time. In the following description the notation V(A,B) denotes the voltage difference between a node A and a node B. The notation V(A) denotes the voltage between node A and ground.

The steps of operation of the circuit 10 are indicated as a plurality of steps S1, S2 . . . S8:

S1) Initially it is assumed that the low side NFET 12 is conducting
    Command low side LSC='True' (high in example of FIG. 2)
    Command high side HSC='False' (low in example of FIG. 2)

S2) A transition from low side to high side is initiated by the command low side LSC going 'False'.
    Command low side LSC='False'
    Command high side HSC='False'

S3) The signal propagates through the low side driver 15, the voltage V(Lgate) decreases down to zero rendering the low side NFET 13 non-conducting.

S4) In the "Non-overlapping" phase, both power switching devices 12 and 13 are non-conducting. As the output inductor L continues to draw current and this current needs to find a path, the switching node SW is decreasing until the body diode of the low side NFET 13 is rendered conducting. The body diode is an intrinsic component of the NFET power device. The voltage across the body diode during reconduction is here below referred as Vdiode.

S5) Once the low side NFET 13 is correctly turned-off, the turn-on command for the high side NFET 12 is issued:
    Command low side LSC='False'
    Command high side HSC='True'

S6) The signal propagates through the level shifter 16 and the High side driver 14 resulting in the Hgate node voltage rising. When the voltage V(Hgate, SW), i.e., a high side gate source voltage, reaches the threshold of the high side NFET 12, the voltage V(SW) on the switching node SW starts to rise S7) During the rising phase of SW node, the voltage V(Hgate,SW) is remaining almost constant, due to a self-limiting effect:

As the voltage V(SW) on the switching node SW rises, an intrinsic capacitance between the drain and the gate of the high side NFET 12, CDG_HSide, needs to be discharged from its initial value of Vin+Vdiode to −Vcc.

The high side driver 14 is limited in term of current it can provide to the gate of the high side NFET 12.

The system finds an equilibrium point when the rising speed of the switching node SW leads to the generation of such a current in the CDG_HSide capacitance that the high side driver 14 saturates.

The voltage V(Hgate,SW) during this phase determines the current which is flowing between the source and drain of the high side NFET 12. This current is in a first approximation proportional to (V(Hgate,SW)−VTH_HSIDE)^2, with VTH_HSIDE being the threshold voltage of the high side NFET 12.

S8) When the voltage on the switching node SW is getting closer to the input voltage Vin value, the previously described effect stops limiting the rise of V(Hgate,SW) which increases again until it reaches V(BOOT,SW).

Figure 3:
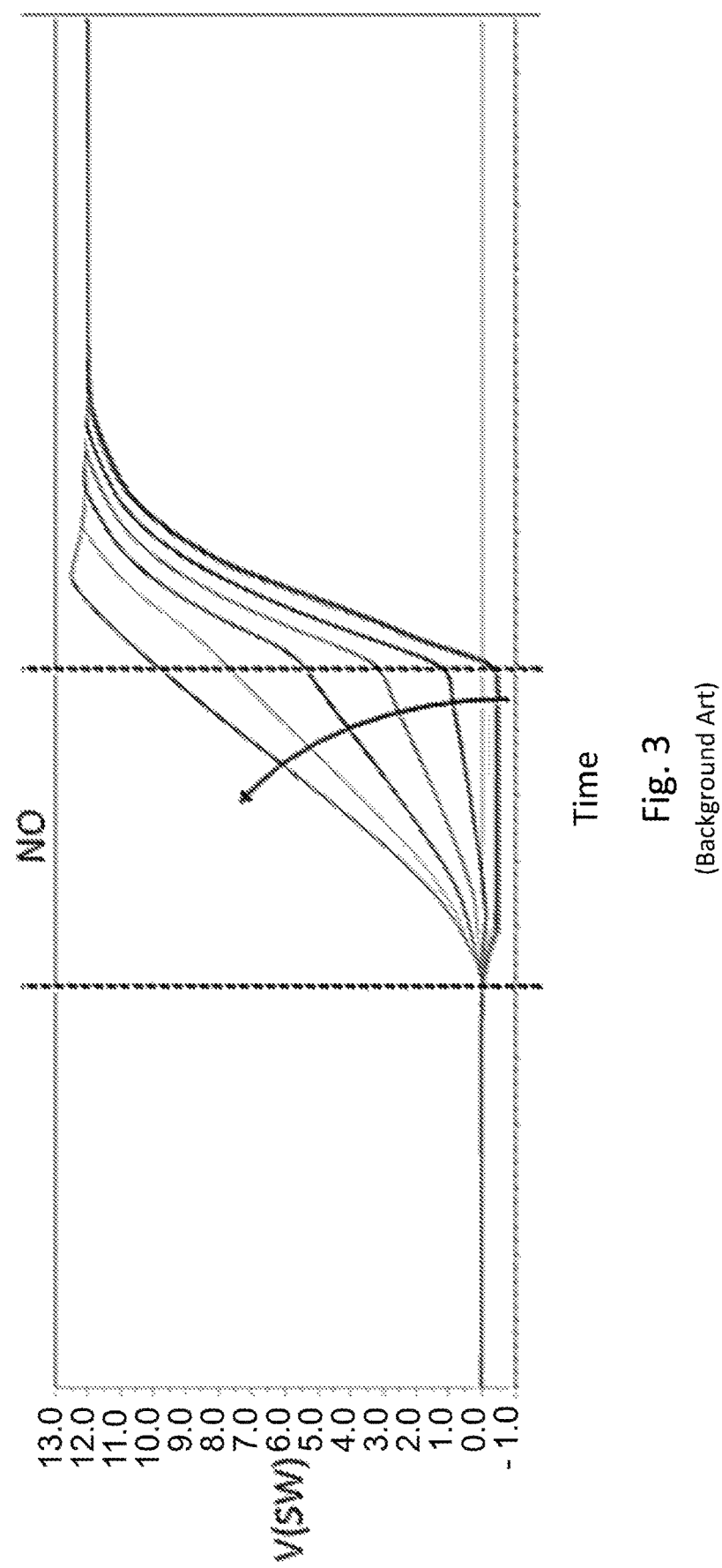

In the case where the current in the inductor L is negative (i.e., has a second polarity that is opposite the first polarity) the operation is different and not driven anymore by the turn-on of the high side NFET 12. During the Non-Overlapping phase, the half bridge 11 is basically in high impedance state and the current from the inductor L is charging the switching node SW which voltage V(SW) rises. The rate of increase of voltage on the switching node SW, depends on the value of the current in the inductor L, input voltage Vin, amount of capacitance on the switching node SW and duration of the Non-overlapping phase. If this rate is high enough, voltage on the switching node SW will eventually reach the point where the body diode of the high side NFET 12 becomes conductive. Illustration of this behavior is given in the time diagram shown in FIG. 3, showing the voltage V(SW) on the switching node SW as a function of time. The Non-Overlapping phase interval is indicated with NO. The different curves represent different voltages V(SW) as the negative current increases in the direction indicated by the arrow. As the switching node SW is already high when the high side NFET 12 is turned-on the effect depicted with respect to step S7 in FIG. 2 is not present.

Integrating two Dual NFET power stages like the stage of converter 10 described with reference to FIG. 1 in a single PMIC with the possibility to use those power stages either independently or in parallel is a challenging task. When used in parallel the turn-on event of the two high side power NFET needs to be perfectly synchronized with a resolution in the range of a tenth of a nanosecond. However due to the presence of level shifters and high side drivers, the time length of the command high side signal HSC path, i.e., the signal path from the high side logical command signal HSC to each gate control signal, which is in FIG. 1 represented by the level shifter 16 and the high side driver 14, can be in the range of 10 ns. Due to manufacturing mismatches, the delay path between two identical power stages can vary in the range of 1 ns.

Figure 4:
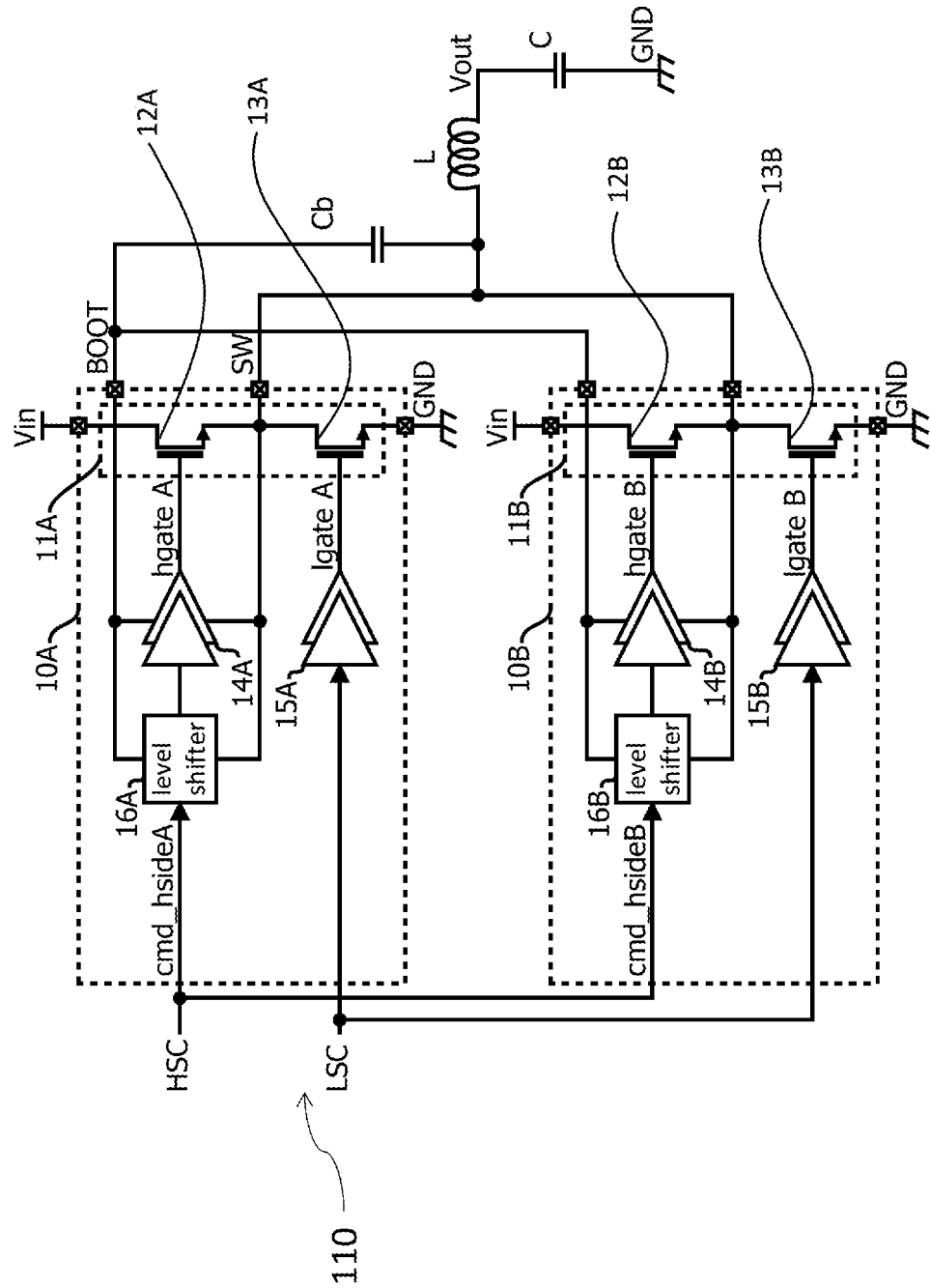
FIG. 4 is a circuit schematic of a known converter circuit including two stages.

To this regard in FIG. 4, a circuit 110 with two Dual NFET power stages, i.e., two step down converters, 10A and 10B integrated is shown. The two converters 10A and 10B have the same structure as the stage of FIG. 1, thus numeric references to the components are the same with the additions of letter A or B if referring to the first converter 10A or second converter 10B. The switching nodes SW of converters 10A and 10B are connected together and to a terminal of the coil L while bootstrap nodes BOOT are connected together and to a terminal of the bootstrap capacitor.

The command signals LSC, HSC are common for the inputs of the two converters 10A, 10B.

As described above, the voltage V(Hgate,SW) of a high side power NFET 12A, 12B is almost constant during the turn-on phase. For sake of explanation the timing mismatch between the signal path from HSC to the output of 14A on one side and HSC to the output of 14B on the other side are represented as a timing mismatch dt on command, or driving, signals cmd_hsideA and cmd_hsideB. The timing mismatch dt of the command signals of the high side drivers 14A and 14B, indicated by driving signals cmd_hsideA and cmd_hsideB in the diagrams of FIG. 5, leads to a voltage difference between voltages V(HgateA,SW) and V(HgateB, SW) when the switching node SW starts rising. Due to the previously described self-limiting effect this difference is maintained during the whole rising phase of the voltage V(SW) at node SW. As the relation between V(Hgate,SW) and current through a given high side NFET is quadratic under these conditions, this voltage difference leads to a large difference in the current flowing through the two high side NFETs 12A, 12B of the converters 10A and 10B. It results in a large difference in the power dissipated by such two NFETs.

Figure 5:
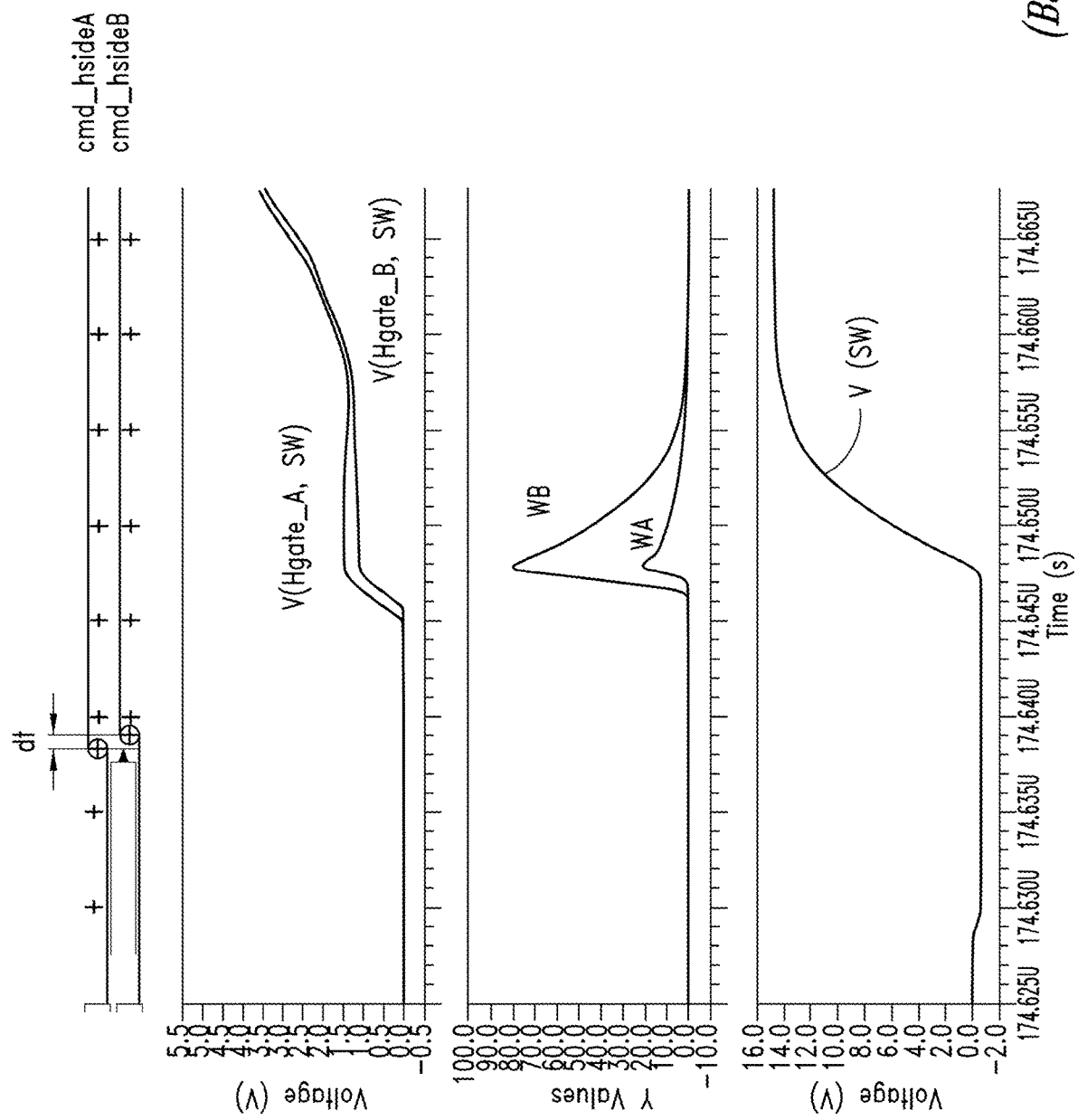
FIG. 5 is a time diagrams representing signals of the circuit of FIG. 4.

This effect can be observed in FIG. 5 in the time diagrams showing signals of the circuit 110, where command signals, V(Hgate,SW) and powers WA, WB dissipated on the switches 12A, 12B are shown as a function of time for each high side NFET 12A, 12B together with the voltage V(SW) on the switching node SW.

The repetition of this behavior at each cycle leads to different aging of the power switching devices and to a reduced possible duration of use for the whole converter apparatus.

In the case of a decreasing or negative current in the coil or inductor L, the problem depicted here is not present because it is not the high side NFET which is driving the rising phase of the switching node SW.

The solution here described provides a converter having the architecture of the converter 110 of FIG. 5, but further including a synchronization system for the two power stages, i.e., converters 10A and 10B, so that the turn-on phase of the two high side power devices occurs simultaneously. The proposed solution is creating a feedback loop which maintains the rising events of both gate signals of the high side switching devices synchronized even in the presence of mismatches in the delay of the signal path within each power stage.

Figure 6:
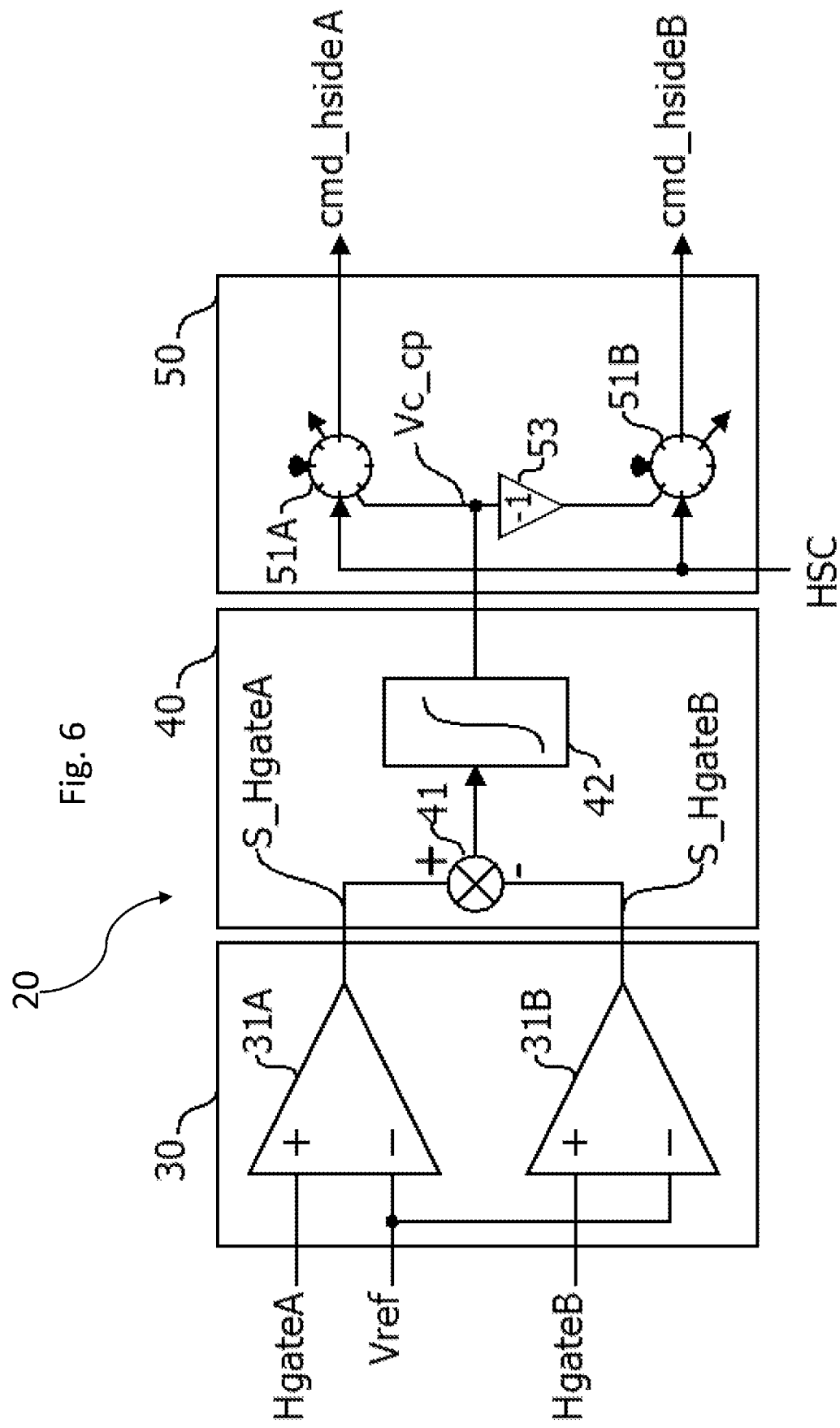
FIG. 6 is a schematic diagram representing a principle underlying the solution here described.

To this regard, in FIG. 6 a synchronization module 20 includes:

a detection module 30 which is configured to detect the rising event of gate signals HgateA and HgateB of the high side switching devices 12A, 12b, by comparing them with a given threshold, a reference voltage Vref, and generating respective sense digital (logical) signals S_HgateA and S_HgateB. In particular in the general embodiment of FIG. 6 are shown two comparators 31A, 31B comparing the gate signals HgateA and HgateB with the reference voltage Vref;

a difference integration module 40 configured to integrate a difference between the sense digital signals S_HgateA and S_HgateB in order to generate a delay control signal Vc_cp. In the general embodiment of FIG. 6 is shown as a difference block 41 calculating the difference of sense signals S_HgateA and S_HgateB, which will be non-zero only during the mismatch interval dt, and an integrator block 42 integrating such difference to obtain delay control signal Vc_cp;

an adjustable differential delay module 50 is configured to use the delay control signal Vc_cp to adjust a differential delay D=dA−dB between the signal path from the high side logical command signal HSC to each gate control signal HgateA and HgateB. The module 50 includes in the general embodiment of FIG. 6 two voltage controlled delay circuits 51A, 51B, which receive as inputs the high side command signal HSC and receive at their respective control inputs the control signal Vc_cp (to be more specific delay circuit 51A receives Vc_cp but delay circuit 51B receives −Vc_cp in order to create a different delay between circuits 51A and 51B (dA−dB=D)), applying then a respective delay on such high side control signal HSC paths to generate delayed command signals cmd_hsideA, cmd_hsideB as seen in FIG. 4, these delay command signals cmd_hsideA, cmd_hsideB then being supplied to high side level shifters 16A, 16B as seen in FIG. 4. An inverting amplifier 53 negates the control signal Vc_cp before it is supplied to the voltage controlled delay 51B.

Figure 7:
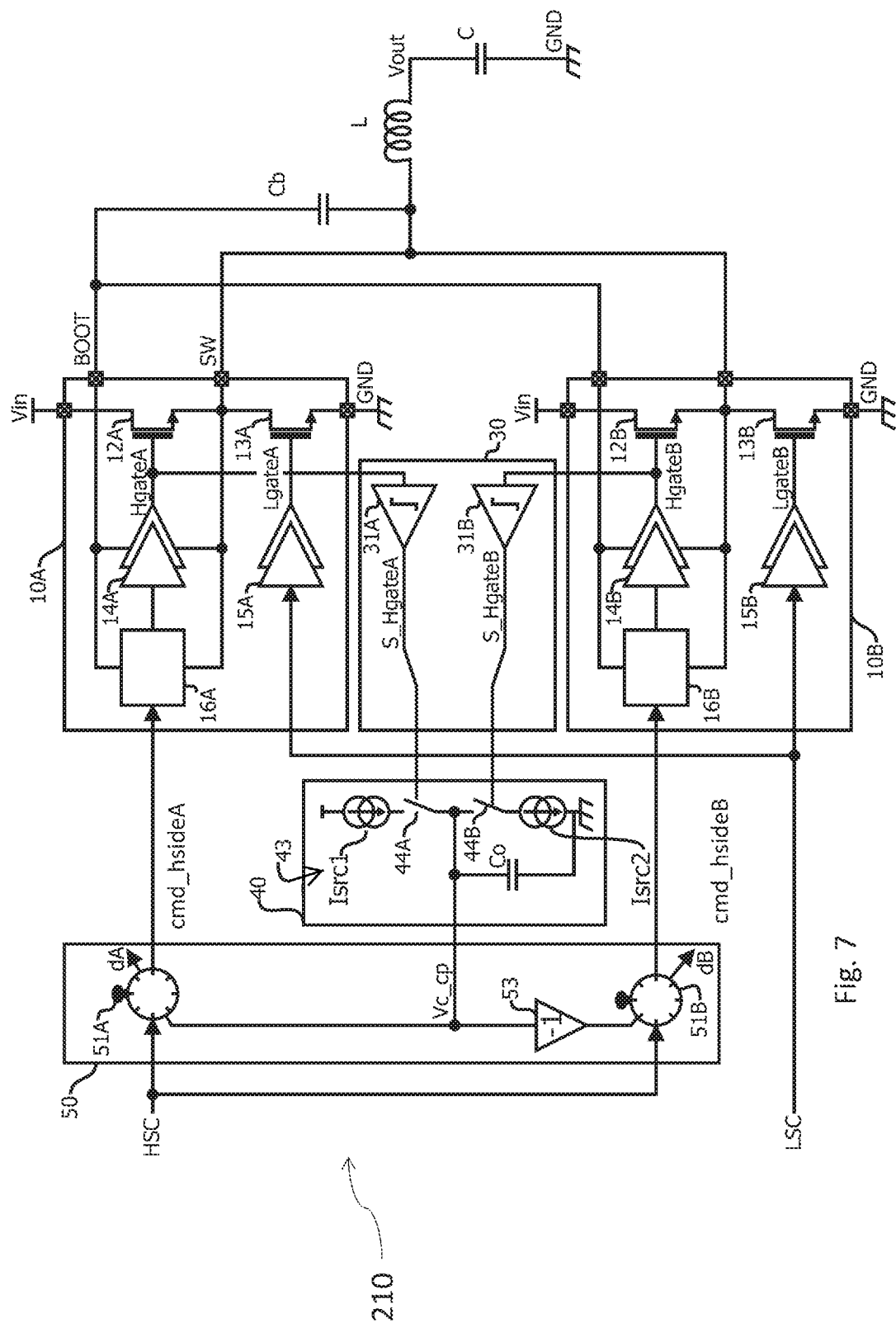
FIG. 7 is a circuit schematics representing an embodiment of the solution here described.

In FIG. 7 it is shown schematically an embodiment of a DC-DC converter circuit 210 with two power stages, i.e., step down converters 10A, 10B connected in parallel, in which is implemented the synchronization module 20 of FIG. 6.

The converter circuit 210 has the same architecture of the circuit 110 of FIG. 5 and it is connected to the synchronization module 20 as follows.

In the detection module 30, the gate-source voltage of the high side power device 12A of the converter 10A, V(HgateA,SW) is sensed by the respective comparator 31A and compared to the given fixed threshold reference voltage Vref. The output of the comparator 31A is the logical sense signal S_HgateA which has the value 'False' when V(HgateA,SW) is below the threshold and 'True' when above. The gate signal of the converter 10B high side power device 12B, HgateB, is sensed by a comparator 31B and compared to the same threshold reference voltage Vref, and the comparator 31B generates a logical signal S_HgateB with the same properties relative to V(HgateB, SW) as just described for the digital sense signal S_HgateA.

The sense signals S_HgateA and S_HgateB are used to drive the inputs of a charge pump 43 which function is to integrate the difference in timing between the two sense signals and generate a control voltage Vc_cp. As shown in FIG. 6 the difference integration module 40 includes a module 41 for calculating a difference between the two sense signals and a module 42 for performing the integration of such difference. In the implementation of FIG. 7 the module 40 is embodied by the charge pump 43, in which two current sources Isrc1, ISrc2 are connected through two switches 44A, 44B to an output capacitor Co. The switches 44A, 44B are driven by sense digital signals S_HgateA and S_HgateB and each switch 44A, 44B is closed when the signal driving it is 'True' while it is open if the driving signal is 'False'. The first current source Isrc1 is sourcing current to the output capacitor Co when the switch driven by sense digital signal S_HgateA is closed. The second current source Isrc2 is sinking current from the output when the switch 44B driven by sense digital signal S_HgateB is closed. Values of current sourced and sinked by current sources Isrc1 and Isrc2 are the same. Thus depending on the inputs S_HgateA and S_HgateB the behavior of control voltage Vc_cp is as follows:

a) when S_HgateA and S_HgateB signals are both 'False', the two current sources Isrc1 and Isrc2 are disconnected from the output capacitor Co, so no current is charging/discharging it and control voltage Vc_cp is maintained constant;

b) when S_HgateA and S_HgateB signals are both 'True', the current sourced by current source Isrc1 is sinked by current source Isrc2 and resulting current to output capacitor Co is zero. As a result the control voltage Vc_cp is maintained constant;

c) when sense digital signal S_HgateA is 'True' and S_HgateB is 'False' only Isrc1 is sourcing current to the output capacitor Co and the output, i.e., control voltage Vc_cp, is increasing;

d) when sense digital signal S_HgateA is 'False' and sense digital signal S_HgateB is 'True' only the source Isrc2 is sinking current from the output capacitor Co and the output, i.e., control voltage Vc_cp, is decreasing.

The output of the charge pump 43, control voltage Vc_cp, is used to drive the adjustable differential delay module 50, specifically the delays dA, dB of two voltage controlled delays 51A and 51B placed in the signal path of the high side command signals HSC of the power stage 10A and the power stage 10B. The voltage controlled delays 51A, 51B operate or behave in the following way:

a) when the signal on their control pin increases, the delay from input to output increases. Thus when control voltage Vc_cp increases, dA increases and dB decreases thus D increases.

b) when the Vc_cp signal on their respective control pins decreases, the delay from input to output decreases. Thus when control voltage Vc_cp decreases, dA decreases and dB increases due to inverting amplifier 53, and thus D=(dA−dB) decreases.

Of course the delay D between the high side control signal HSC paths is given by the algebraic sum of the delays dA, dB set for the first converter 10A and second converter 10B, respectively.

As shown the inverting amplifier 53 is connected between the control voltage Vc_cp and one of the two voltage controlled delay circuits 51A, 51B, namely the voltage controlled delay circuit 51B in FIG. 7, so that the delays dA, dB vary symmetrically around a default delay Tdef, i.e., delay dA=Tdef+D/2, dB=Tdef−D/2.

Figure 8:
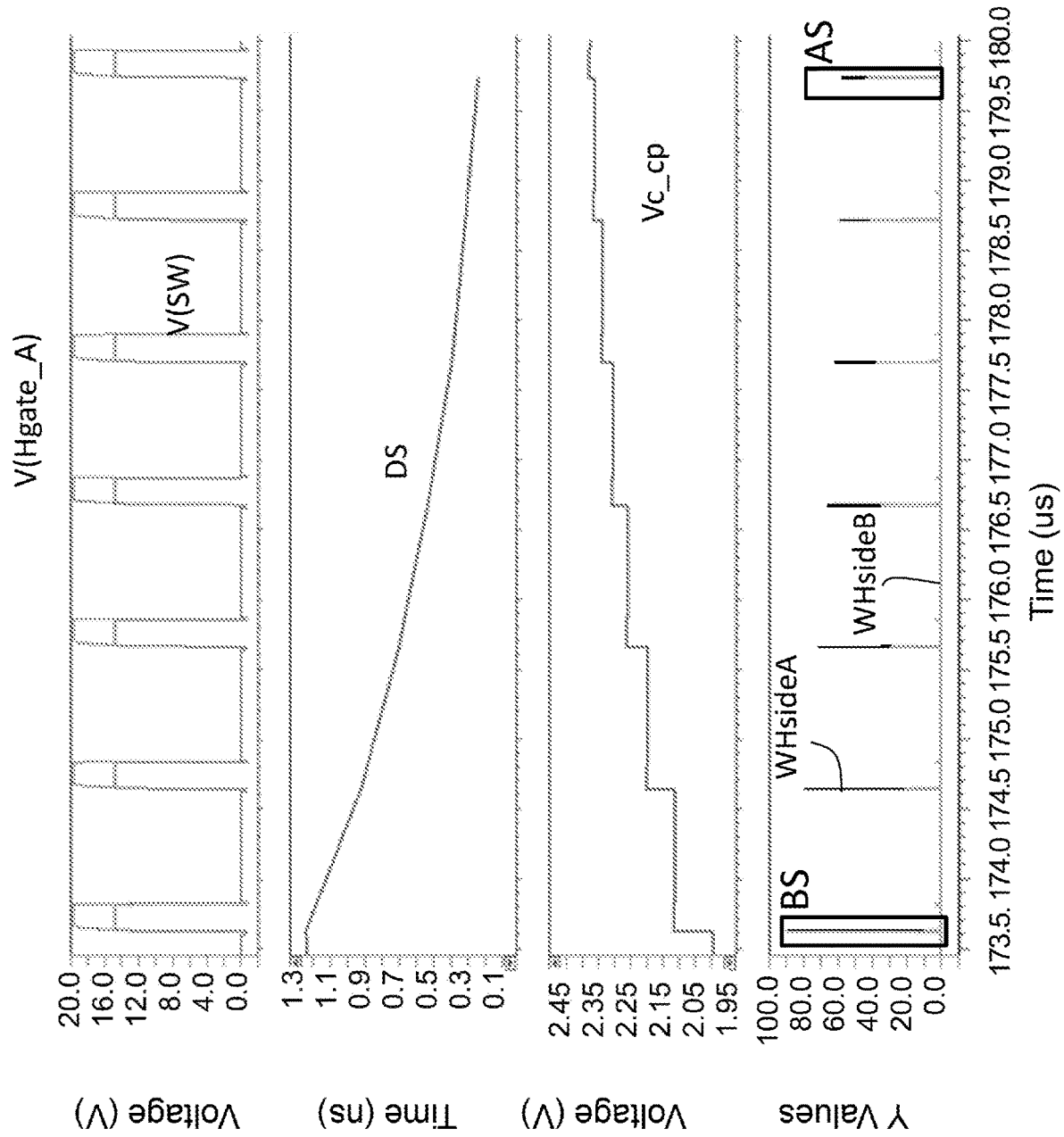
FIGS. 8, 9 and 10 are time diagrams representing signals of the circuit of FIG. 7.
Figure 9:
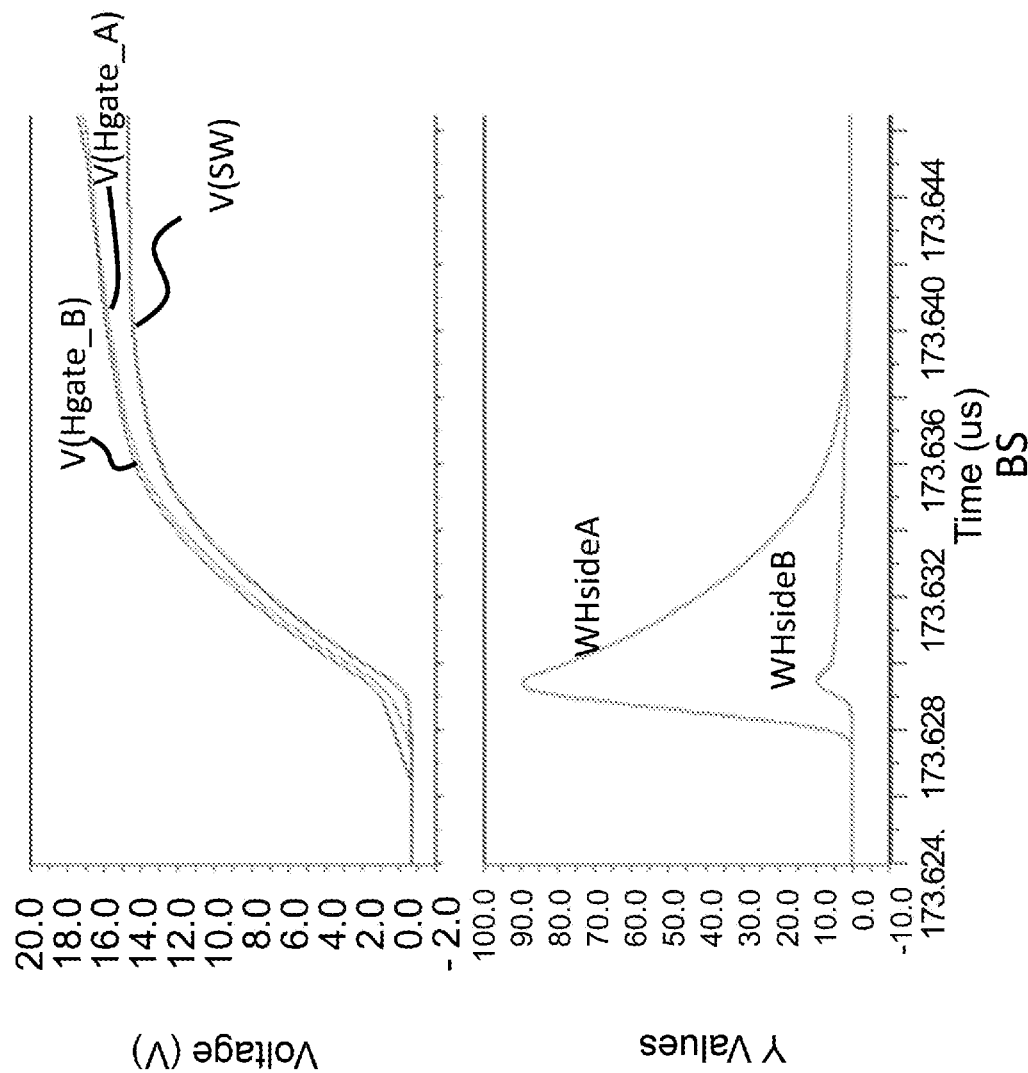
Figure 10:
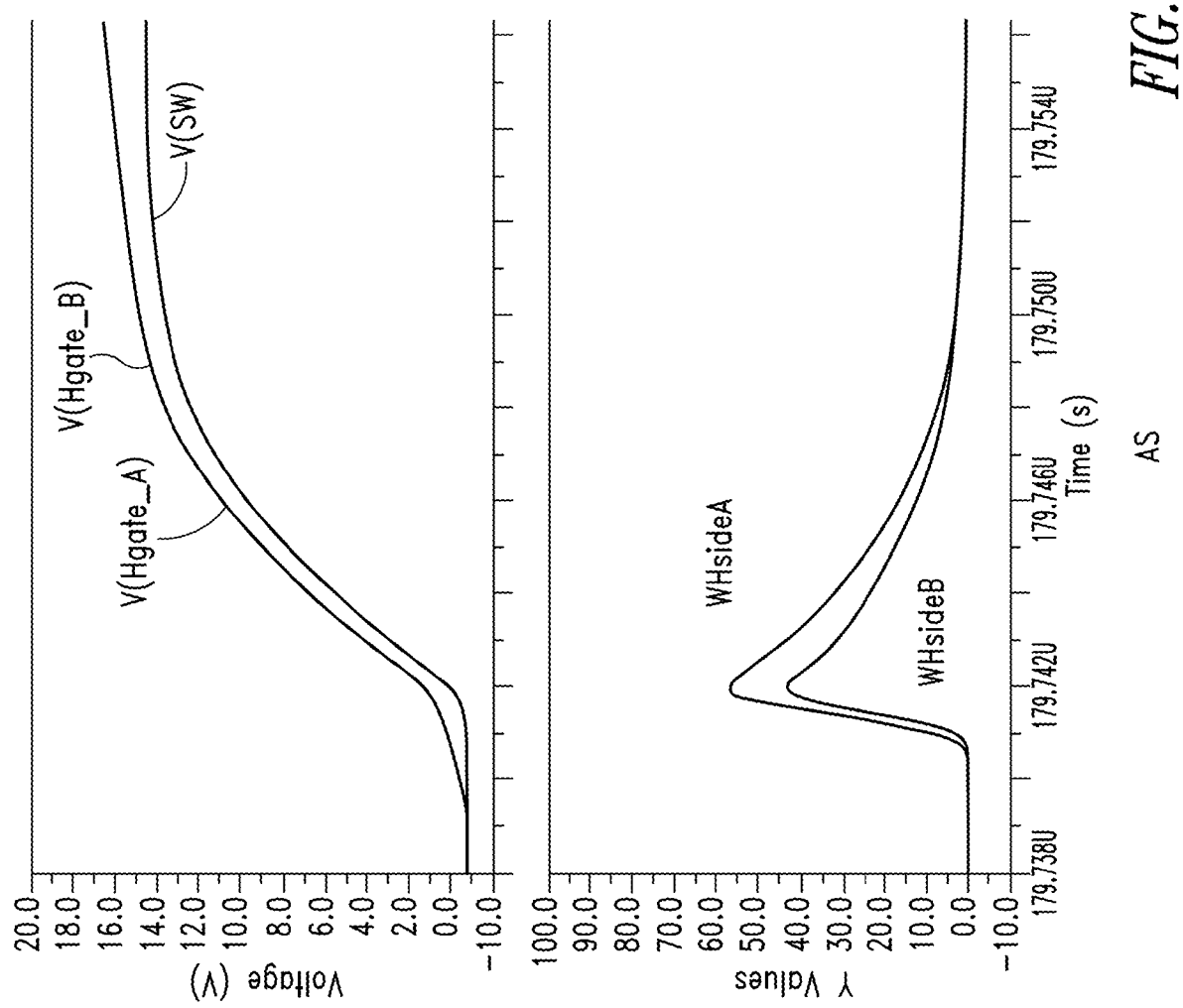

In FIG. 8 it is shown a diagram representing signals illustrating the operation of the circuit of FIG. 7. In particular it is shown as a function of the time, the time difference DS between the sense signals S_HgateA, S_HgateB, substantially corresponding to the time mismatch dt applied between the rising edges of gate signals HgateA and HgateB. Also represented in FIGS. 8-10 as a function of time are the node voltages V(SW), V(HgateA), V(HgateB), control voltage Vc_cp, and the power dissipated on the two high side devices, WHsideA and WHsideB. FIG. 8 shows such signals on a time window, or range, between 173.5 μs and 180 μs. For sake of illustration it is here assumed that when the circuit is enabled and starts operating, a delay mismatch dt of 1.2 ns is present between the rising edges of gate signals HgateA and HgateB. This delay mismatch dt is visible on the first occurrence of the switching node SW (inside window BS). A detailed view of this first occurrence is given in FIG. 9, which represents node voltages V(SW), V(Hgate_A), V(HgateB), and the power dissipated on the two high side devices, WHsideA and WHsideB before the synchronization on a before synchronization time window BS having much smaller scale, between 173.624 and 173.646 μs, i.e., a range of about 20 ns, where the high side device of power stage 10A is seen to dissipate the largest portion of power. The course of event for this occurrence is as follow:

a) the gate signal HgateA rises 1.2 ns in advance of the gate signal HgateB;

b) the sense signal Sense HgateA becomes "True" 1.2 ns before sense signal Sense HgateB;

c) as a result of the event under point b), the output capacitor Co is charged for 1.2 ns by the current source Isrc1 and the control voltage Vc_cp rises (as shown in FIG. 8);

d) the control voltage Vc_cp increase leads for the next occurrence of a rising of the voltage on the switching node SW, to an increase of the delay D in the path of the command signal HSC to the power stage 10A versus the command signal HSC to the power stage 10B;

e) in the second occurrence of a rising of the voltage on the switching node SW, the gate signal HgateA rises 0.8 ns before gate signal HgateB.

After a few cycles, the difference of timing between rising edges of gate signals HgateA and HgateB has completely disappeared. A plot of gate signals and power dissipated in each power device when synchronized is given in FIG. 10, in an after synchronization time window AS between 179.738 μs and 179.756 μs. As can be seen in the bottom signal diagram of FIG. 10, the levels of power WHsideA and WHsideB dissipated in each power high side switching device 12A, 12B are similar in comparison to those levels during the before synchronization time window BS of FIG. 9.

Figure 11:
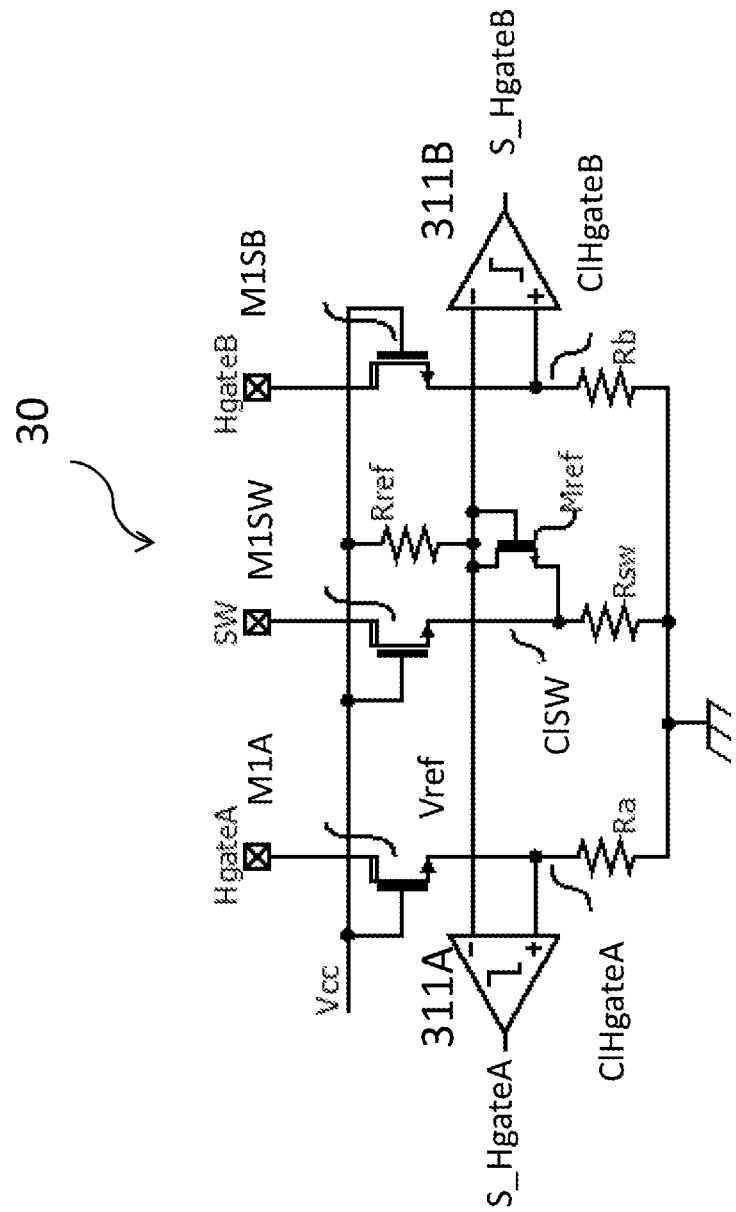
FIG. 11 shows in detail an embodiment of a circuit module of the circuit of FIG. 7.

An implementation of the detection module or circuit 30 is shown in FIG. 11. The inputs of detection circuit 30 are represented by the gate signals HgateA, HgateB and the signal at the switching nodes SW while it outputs the digital, i.e., logical, sense signals S_HgateA and S_HgateB. The circuit 30 comprises clamp transistors M1A, M1B and M1SW which function is to limit the amplitude of respective clamped signals C1HgateA, C1HgateB and C1SW to protect the rest of the detection circuitry from the high voltage level which can occur on inputs HgateA, HgateB and SW, on their drain electrodes. The gates are connected to the supply voltage Vcc, while their source electrode are connected through respective bias resistors Ra, Rb, Rsw to the ground GND. On such source electrodes are formed the respective clamped signals C1HgateA, C1HgateB and C1SW. A further reference bias resistor Rref is provided between the supply voltage and the drain of a reference transistor Mref. The bias resistors Ra, Rb, Rsw and Rref have the function to provide bias current for the operation. Those resistors can be replaced by current sources without affecting the operation of the circuitry. The reference transistor Mref is diode connected, on the node common to the gate and the drain a threshold voltage is being formed, i.e., reference voltage Vref. The reference transistor Mref has the function to generate a reference voltage Vref added to the clamped voltage V(C1SW) relative to the switching node SW. Two comparators 311A and 311B compare voltages C1HgateA versus Vref to generate the sense signals S_HgateA and C1HgateB versus Vref to generate sense signal S_HgateB.

Operation of the circuit is as follow:
as long as clamp transistors M1A, M1B and M1SW gate-source voltages are higher than their respective thresholds, indicated as Vth(M1A), Vth(M1B) and Vth(M1SW), it can be approximated that the voltage on their source is equal to the voltage on their drains and thus:
V(C1HgateA)=V(HgateA) if V(HgateA)<Vcc-Vth (M1A)
V(C1HgateB)=V(HgateB) if V(HgateB)<Vcc-Vth (M1B)
V(C1Sw)=V(SW) if V(SW)<Vcc-Vth(M1SW)

a voltage Vgs(Mref) is generated across the reference transistor Mref. This voltage is designed so that it is related to the threshold of the high side power NFET 12A, 12B in the power stages 10A, 10B. Given that the reference transistor Mref is of the same type of device than the High Side power NFET 12A, 12B, variations of Vgs(Mref) with process or temperature are the same as for the power devices. This voltage Vgs(Mref) is added to the voltage V(C1SW) generating the reference Vref level. As long as clamp transistor M1SW is not clamping the C1SW node it is obtained thus Vref=V (SW)+Vgs(Mref). Vgs(Mref) is set in a way that this voltage is lower than V(Hgate,SW) during rising transition of the switching node SW. The purpose of this setting is to detect the rising of high side gate signals in their first rising period, before the switching node SW is actually rising.

toggle point of comparators 311A and 311B occurs when V(C1HgateA)=Vref and V(C1HgateB)=Vref respectively. Those thresholds can be recomputed as:
V(HgateA)>V(SW)+Vgs(Mref)→V(HgateA,SW)> Vgs(Mref) for comparator 311A;
V(HgateB)>V(SW)+Vgs(Mref)→V(HgateB,SW)> Vgs(Mref) for comparator 311B;

Thus, by clamping the gate signals, the detection circuit 30 discussed above allows all the detector functions of the detection circuit under the Vcc supply domain and thus fully leverages CMOS technology. By comparing the high side power devices gate versus a threshold lower than the value of those power devices gate-source voltage during rising transition of the switching node, this circuit features a linear relation between the inputs and output signals delays.

Figure 12:
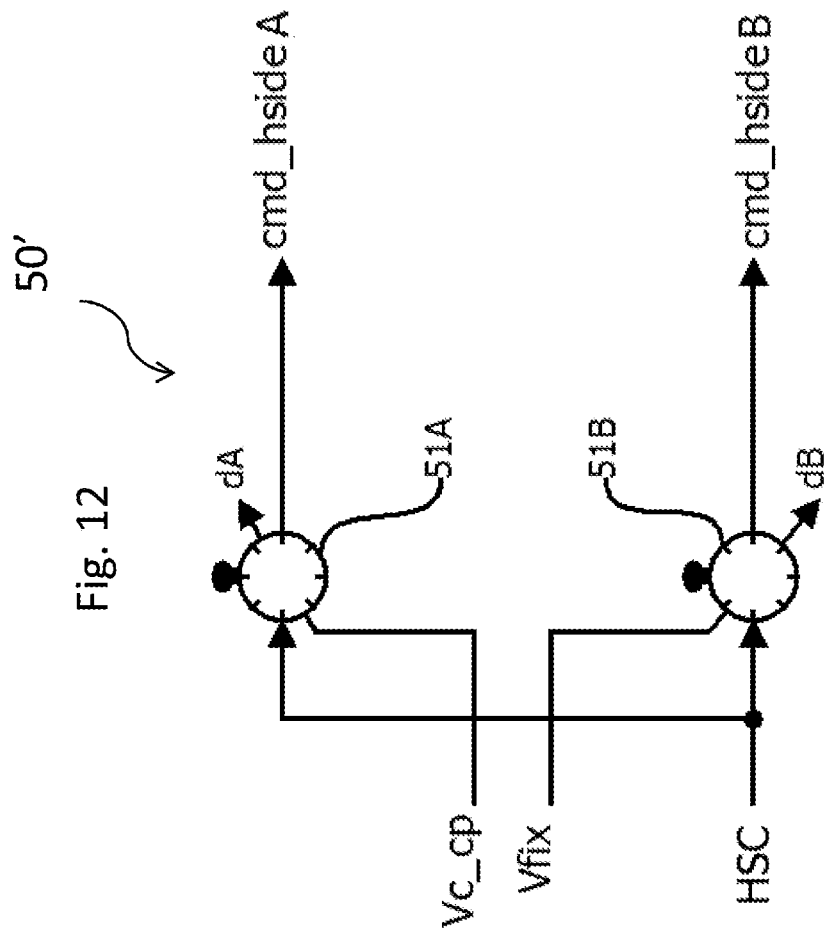
FIG. 12 shows in detail an embodiment of a further circuit module of the circuit of FIG. 7.

A second possible implementation 50' for the adjustable differential delay circuit 50 is shown in FIG. 12. In this implementation the control voltage Vc_cp is driving only the delay dA in the high-side FET 12A command path, which determines the input cmd_hsideA of the driver 14A. The voltage controlled delay in the high-side FET 12B command path to signal cmd_hside_B is driven by a constant reference Vfix. This implementation has half the gain from the control voltage Vc_cp to output delay between the command of high side NFET 12A and high side NFET 12B with respect to the solution shown in FIG. 7. It has however the advantage of simplicity as the function −1, i.e., inverting amplifier 53, is removed.

Figure 13:
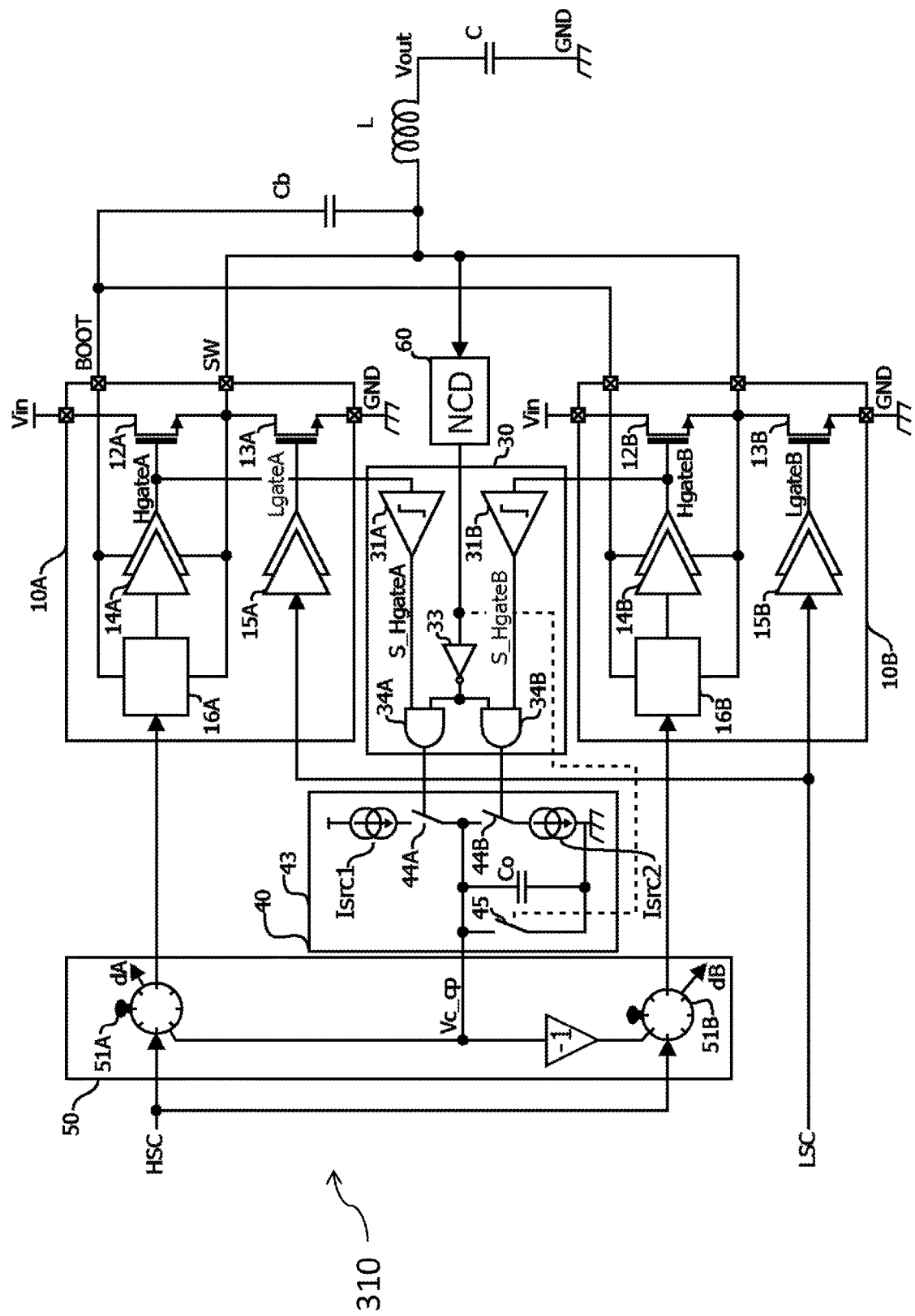
FIG. 13 is a circuit schematics representing a further embodiment of the solution here described.

As already mentioned previously, in case the current in the inductor L is negative, the behavior of the rising transition is different and the need for synchronization is not so important. Previously discussed circuitry is not functional in the case of reverse coil current and it is thus needed to address specifically this situation in order not to make the loop drift and diverge. Therefore, a circuit sensing the sign of the coil current is needed to guarantee the validity of the information from detection circuitry 30. This circuit will be thereafter referred to as NCD (Negative Current Detection) circuit, 60. A block diagram of the circuit implementation given in FIG. 7 including the NCD circuit 60 is shown in FIG. 13.

The input of the NCD circuit 60 is connected to the switching node SW. The output of the NCD circuit 60 is connected to an inverter 33 having an output supplied as one of the inputs of two AND gates 34A, 34B. Such two AND gates 34A, 34B which at the other input receive the output of the two comparators 31A, 31B. The output of the NCD circuit 60 is "True" if the current is reverse in the coil L. In such a case the output of the two comparators 31A, 31B on HgateA and HgateB are gated and do not act on the charge pump 43. Optionally, it is also possible to use the NCD signal to reset the output of the charge pump 43 via a charge pump reset switch 45. The optional connection from NCD output to the charge pump reset switch 45 is represented in a dotted line in FIG. 13.

The solution proposed is a local, compact circuit that is able to provide a rapid sense of the current when needed: just before the High Side is turned on.

An embodiment of the NCD circuit 60 is shown in FIG. 14. Such NCD circuit 60 is configured to provide information on the polarity of the current in the inductor L, by sensing the derivative of the voltage on the switching node SW, V(SW). If the current in the inductor L is negative, this derivative will be non-zero during the "Non-overlapping" NO phase. The output consists in a digital negative current signal NC.

The circuit 60 includes a derivator module 61, i.e., an operational amplifier 61a configured as differentiator circuit in which a resistor R provides negative feedback and a capacitor C is used at the input side, and a sampler module 62. In order to be very fast—the detection window width is in the order of tens of ns—the core of the amplifier 61a uses a single transistor approach, with a single transistor 61b and a current source 61c as a load on a drain electrode of the single transistor. This structure, shown in FIG. 15, provides the desired derivative transfer function.

Figure 16:
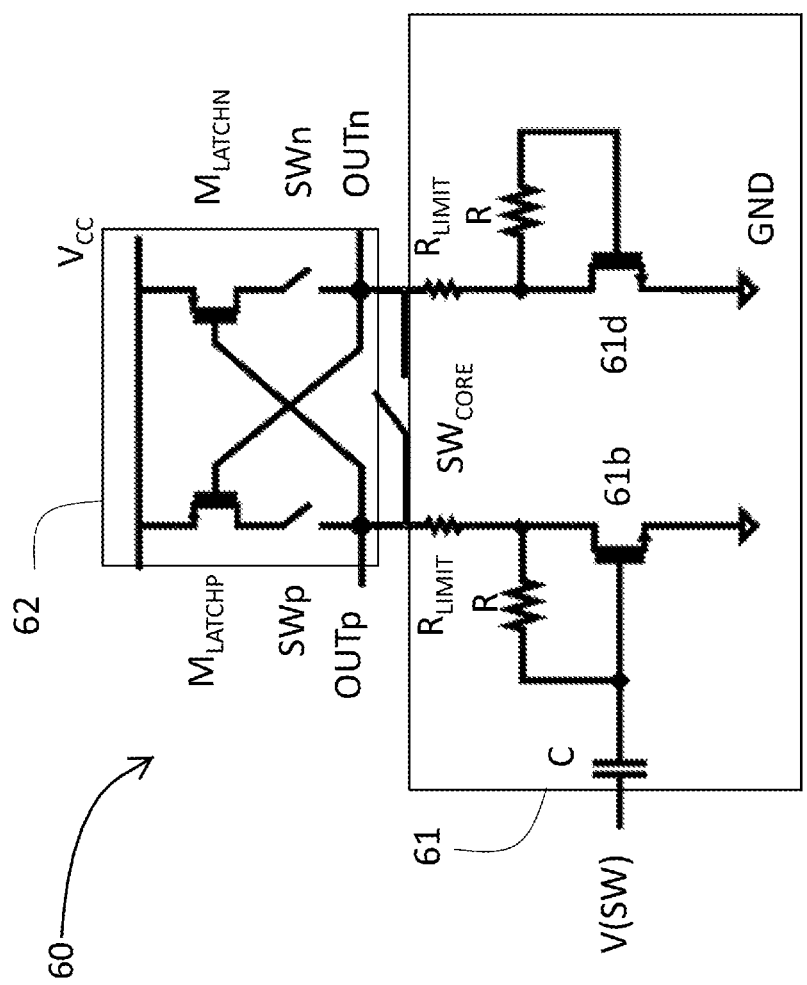
FIG. 16 shown an implementation of the circuit of FIGS. 14 and 15.

FIG. 16 is a schematic of one embodiment of \the complete NCD circuit 60.

The circuit 60 comprises the following elements:

a core circuit comprises a MOS transistor (NMOS transistor in the embodiment of FIG. 16) embodying the single transistor 61*b*, i.e., a core transistor 61*b*, and resistor R and capacitor C. This provides a derivative signal entering into the sampler module 62. Such core circuit along with a limiter resistor $R_{LIMIT}$ on the drain of the core transistor 61*b* identifies a core branch;

a reference circuit comprises reference transistor 61*d*, which is configured in a transdiode fashion using a resistor R, equal (for matching purposes) to the resistor of core transistor 61*b* and provides a reference. Such reference circuit along with a respective limiter resistor $R_{LIMIT}$ on the drain of the core transistor 61*b* identifies a reference branch;

the drains of the core transistor 61*b* and reference transistor 61*d* are connected, through the limiter resistors $R_{LIMIT}$, to respective switches SWp and Swn, connected at their other terminal to respective latch transistors, in particular PFETs, $M_{LATCHp}$ and $M_{LATCHn}$, with gates that are cross-connected, in particular the gate of one latch transistor connected on one branch, e.g., on the core branch transistor $M_{LATCHp}$ (dually on the reference branch $M_{LATCHn}$) is connected to a sampler output node OUTn (OUTp) on the other branch, i.e., to the node between the switch SWn(SWp) and the resistor $R_{LIMIT}$, so that it is separated from the drain of the other latch transistor $M_{LATCHn}$ by such switch SWn. Thus latch PFETs $M_{LATCHp}$ and $M_{LATCHn}$, together with switches SWp and Swn, form a semi-latch circuit, which functions as the sampler 62. A further switch $SW_{CORE}$ connects the two sampler nodes OUTp, OUTn nodes.

Such semi-latch structure has two possible ON states, and an OFF state:

the "OFF state", in which switches SWp and SWn are open, no current flows from supply, the whole circuit is un-biased;

the "ON-reset" state, in which switches SWp and SWn are closed, and switch $SW_{CORE}$ is closed as well. The circuit in this phase is in a pre-bias condition, output nodes OUTP and OUTN are at the same voltage and equal to the supply voltage divided by the resistive partition between the latch transistors, $M_{LATCHp}$ and $M_{LATCHn}$ and switches SW and Swn (which are usually embodied by transistors as well) in parallel, and the circuit elements of the core and reference branches in parallel. The total resistance from supply voltage to ground sets the bias current of the circuit;

the "ON-evaluation" state, in which switches SWp and SWn are closed, but the core switch $SW_{CORE}$ is open. In this phase, the two outputs OUTp and OUTn drift apart, depending on the input differential current signal coming from core and reference branches.

The circuit shown in FIG. 16 is initially in the OFF state. When the "Non-overlapping phase" starts, the semi-latch structure is put in the "ON-reset" state, the whole circuit 60 is in a pre-biased condition. This phase is useful to bias the derivator module 61 composed of the core transistor 61*b* and reference transistor 61*d*, now ready to accept an input signal.

In this phase a derivative current is already entering through the "core" circuit but as core switch $SW_{CORE}$ is closed, it is not able to drift the differential output apart, due to the low impedance shown by the "ON-reset" state latch.

Eventually, when the "Non-overlapping" phase is finished, the sampling signal, i.e., digital negative current signal NC, at the sample outputs OUTp and OUTn is provided. The latch enters in the "ON-evaluation" state and will therefore provide information on the input derivative, through a differential output of sampler output nodes OUTP and OUTN.

These two nodes, are afterwards processed by a simple logic, in order to provide a digital output useful to freeze the main synchronization loop.

The limiter resistor $R_{LIMIT}$ is intended to limit current consumption when latch is in the "ON-reset" state.

Thus, with reference to NCD circuit 60 just described, it represents fast, compact circuit to locally provide an information about the current polarity, in a total independent way from classical and costly (current consumption, trimming bits) Zero Current comparators.

In particular, the circuit 60, described above and called an NCD circuit, is used in this converter circuit as "disabler". Its applications though can be extended to other purposes, since it can provide a useful monitoring signal for DC-DC control systems.

In fact, it can be used as improved implementation of a well-known and extensively-used "Zero-current Comparator", especially for very low resistive power FETs (such as external discrete ones). In this case the design of a classical "Zero-current Comparator" is very demanding in terms of silicon area and trimming procedure costs. The above mentioned circuit can be used to break design complexity vs. performance trade-off of a conventional comparator.

Therefore, the description here discloses also a includes a circuit configured to detect a negative current as described in FIGS. 14, 15, 16, includes a circuit (e.g., circuit 60) configured to detect a negative current flowing in the coil which includes a derivator module (e.g., module 61) configured to sense the derivative of a voltage, and in particular includes also a sampler circuit, this circuit being configured to be applied in a converter circuit as disclosed above or in another circuit arrangement which requires negative current detection and uses the enabling or disabling signal like the one formed at the output of the negative detection circuit.

Then, a DC-DC converter circuit according to one or more embodiments may include:

a first step down converter (e.g., power stage 10A) comprising a first pair of switching devices, in particular transistors, (e.g., NFETs 12A, 13A) in an bridge configuration;

a second step down converter (e.g., power stage 10*b*) comprising a second pair of switching devices (e.g., NFETs 12B, 13B) in a bridge configuration, said first and second step down converter being connected in parallel to an output node (e.g., node SW) connected to an output coil (e.g., inductor L), said first and second step down converter receiving as command input same logical command signals (e.g., signals HSC, LSC), wherein said converter circuit includes a feedback loop comprising a synchronization module (e.g., module 20) receiving as feedback control signal the gate control signals (e.g., HgateA, HgateB) of high side switching devices of said first and second pairs, said synchronization module adjusting as a function of said gate control signals by a delay adjustment circuit (e.g., circuit 50 or 50') a delay (e.g., delay dA, dB) in the path of each gate control signal of the high side switching device to synchronize them one with respect to the other.

In one or more embodiments said circuit comprises a detector circuit configured to sense a rising edge of each gate control signal supplying a pair of respective logical sense signals, a circuit configured to calculate a difference between said logical sense signals and to integrate said difference to generate a control signal said delay adjustment circuit being connected to receive said control signal and to perform said modifying a delay in a signal path from a high side logical command signal to each gate control signal of the high side switching device under the control of said control signal to synchronize said rising edge of each gate control signal one with respect to the other.

In one or more embodiments said detection module comprise two comparators comparing the gate signals with a reference voltage.

In one or more embodiments said circuit configured to calculate a difference between said logical sense signals and to integrate said difference to generate a control signal comprises a charge pump receiving as inputs said sense signals and comprising current sources connected through respective switches driven by said logical sense signals to charge an output capacitor.

In one or more embodiments said adjustable differential delay module comprise two voltage controlled delay circuit which receive as input the high side command signal and receiving at their control input the control signal, applying then a respective delay on command signals issued.

In one or more embodiments said adjustable differential delay module includes an inverting amplifier configured to negate the control signal before it is supplied to the voltage controlled delay of the second converter.

In one or more embodiments said adjustable differential delay module in which the first voltage controlled delay circuit is driven by the control voltage and the second voltage controlled delay circuit is driven by a fixed voltage.

In one or more embodiments said converter circuit includes a circuit configured to detect a negative current flowing in the coil and configured to receive as input the signal on said switching node and to issue a signal disabling the synchronization module.

In one or more embodiments said circuit configured to detect a negative current includes a derivator module configured to sense the derivative of the voltage on the switching node.

The solution here described is related also to a method of DC-DC conversion using a first step down converter comprising a first pair of switching devices, in a half bridge configuration;

a second step down converter comprising a second pair of switching devices in a half bridge configuration, connected in parallel to an output node connected to an output coil and receiving as command input same logical command signals, performing a synchronization of each gate control signal of the high side switching device one with respect to the other by picking said gate control signal as feedback signal in a feedback loop adjusting as a function of said gate control signals a delay in a signal path from a high side logical command signal to each gate control signal of the high side switching device.

One or more embodiments may include detecting a rising edge of each gate control signal supplying a pair of respective logical sense signals, calculating a difference between said logical sense signals and integrating said difference to generate a control signal adjusting said delay in a signal path from a high side logical command signal to each gate control signal of the high side switching device under the control of said control signal to synchronize said rising edge of each gate control signal one with respect to the other.

Without prejudice to the underlying principles, the details and embodiments may vary, even significantly, with respect to what has been described by way of example only, without departing from the extent of protection.

The solution here described refers to converter including half bridges, however the solution may also extend to architectures in which two half bridges are connected to obtain a full bridge.

The extent of protection is defined by the annexed claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A DC-DC converter circuit, comprising: a first converter including a first switching device configured to receive a first control signal; a second converter including a second switching device configured to receive a second control signal, wherein said first and second converters are connected in parallel to a switching node configured to be connected to an output coil, and wherein said first and second converters receive a logical command signal; and a synchronization module configured to receive the first and second control signals of the first and second switching devices, said synchronization module configured to adjust as a function of said first and second control signals respective first and second delays in respective first and second signal paths from the logical command signal to each the first and second control signals to synchronize the first and second control signals, wherein said synchronization module further comprises: a detector circuit configured to sense rising edges of the first and second control signals and configured to generate a pair of sense signals in response to the sensed rising edges of the first and second control signals, each sense signal indicating the rising edge of a corresponding one of the first and second control signals; a difference integration circuit configured to calculate a difference between said sense signals and to integrate said difference to generate a delay control signal; and an adjustable differential delay circuit coupled to receive said delay control signal and configured to modify, under control of the delay control signal, the respective delay in the respective signal path from the high side logical command signal to each of the first and second control signals of the high side switching devices to synchronize said rising edges of the first and second control signals.

2. The DC-DC converter circuit of claim 1, wherein said detector circuit comprises two comparators, each comparator configured to compare a corresponding one of the first and second control signals with a reference voltage and configured to generate, based on the comparison, a corresponding one of the pair of sense signals.

3. The DC-DC converter circuit of claim 1, wherein said difference integration circuit comprises a charge pump including a pair of current sources, each current source coupled through a respective switch to a node on which the delay control signal is provided and each of the current sources configured to be driven by a corresponding one of said sense signals to charge an output capacitor coupled to the node.

4. The DC-DC converter circuit of claim 1, wherein said adjustable differential delay circuit comprises two voltage controlled delay circuits configured to receive the high side command signal and the delay control signal, each of the two voltage controlled delay controls circuits configured to apply a respective delay to the high side command signal to generate a corresponding delayed command signal.

5. The DC-DC converter circuit of claim 4, wherein said adjustable differential delay circuit includes an inverting amplifier configured to negate the delay control signal before the delay control signal is supplied to one of the two voltage controlled delay circuits.

6. The DC-DC converter circuit of claim 4, wherein said adjustable differential delay module in which one of the two voltage controlled delay circuits receives the delay control voltage and the other one of the two voltage controlled delay circuits receives a fixed voltage.

7. The DC-DC converter circuit of claim 1, further comprising a negative current detection circuit configured to detect a negative current flowing in the output coil and configured to receive a voltage signal on said switching node and to generate a negative current detection signal that is provided to disable the detector circuit.

8. The DC-DC converter circuit of claim 7, wherein said negative current detection circuit comprises a derivator module configured to sense a derivative of the voltage signal on the switching node.

9. The DC-DC converter circuit of claim 7, wherein said negative current detection circuit comprises:
a derivator module including a core circuit including a single transistor and a matching reference transistor, the single transistor configured to generate a derivative signal based on the voltage signal on the switching node; and
a semilatch structure connected to the single transistor and the reference transistor and configured to operate as a sampler circuit, the semilatch structure configured to generate said negative current detection signal in response to the derivative signal.

10. The DC-DC converter circuit of claim 1, wherein each of the switching devices comprises a MOS transistor.

11. The DC-DC converter circuit according to claim 1, wherein the first converter includes a first half bridge circuit including the first switching device, the second converter includes a second half bridge circuit including the second switching device, and the first and second half bridge circuits are connected to the output coil and are configured to drive the output coil.

12. A switching converter, comprising:
a first converter circuit including a first high side switching device coupled to a switching node and configured to receive a first command signal, the first converter circuit configured to generate a first control signal based on the first command signal and to provide the first control signal to control switching of the first switching device;
a second converter circuit including a second high side switching device coupled to the switching node and configured to receive a second command signal, the second converter circuit configured to generate a second control signal based on the first command signal and to provide the second control signal to control switching of the second switching device; and a synchronization circuit coupled to the first and second converter circuits and configured to receive an input command signal, the synchronization circuit configured to generate the first and second command signals based on the input command signal, each of the first and second command signals having a respective delay relative to the input command signal and the synchronization circuit configured to adjust the respective delays of the first and second command signals based on the first and second control signals, wherein the synchronization circuit comprises a capacitance coupled to a control node and wherein the synchronization circuit is configured to control charging and discharging of the control node responsive to the first and second control signals to generate a delay control signal on the control node, the synchronization circuit further configured to adjust values of the respective delays of the first and second command signals based on the delay control signal.

13. The switching converter of claim 12, wherein each of the converter circuits comprises a step down converter circuit.

14. The switching converter of claim 13, wherein each of the step down converter circuits includes a half-bridge including the corresponding one of the first and second high side switching devices.

15. The switching converter of claim 12, further comprising an additional step down converter circuit, wherein the synchronization circuit is further configured to adjust delays of respective command signals associated with each of the additional step down converter circuit based on respective control signals controlling the switching of a high side switching device in each of the at least one additional step down converter circuit.

16. The switching converter according to claim 12, further comprising an output coil connected to the switching node, wherein the first converter circuit includes a first half bridge circuit including the first high side switching device and the second converter circuit includes a second half bridge circuit including the second high side switching device, and the first and second high side switching devices are configured to drive the output coil.

17. A method, comprising: generating an input command signal to control switching of high side transistors in a plurality of parallel connected switching converters, each switching converter including a half bridge circuit including the corresponding high side transistor; generating a plurality of high side command signals based on the input command signal, each of the high side command signals having a respective delay relative to the input command signal; generating a plurality of control signals in response to the plurality of high side command signals, each control signal being generated in response to a corresponding one of the high side command signals and being applied to a control node of the high side transistor in a corresponding one of the plurality of parallel connected switching converters; adjusting the delays of the high side command signals as a function of the plurality of control signals to synchronize the plurality of control signals, wherein adjusting the delays includes: detecting a rising edge of each of the plurality of control signals; calculating a difference between said detected rising edges; integrating said difference to generate a delay control signal; and adjusting said delays based on the delay control signal.

18. The method of claim 17, wherein detecting a rising edge of each of the plurality of control signals comprises comparing each of the plurality of control signals to a reference voltage.

19. The method of claim 17, wherein calculating the difference between the detected rising edges comprises subtracting the plurality of control signals to generate a difference signal and integrating the difference signal.

20. The method of claim 17, further comprising the high side transistors driving a single output coil under control of the synchronized plurality of control signals.

* * * * *